United States Patent [19]

Shelton

[11] 4,231,665
[45] Nov. 4, 1980

[54] FILTER AID DISPENSING ARRANGEMENT

[76] Inventor: Winston L. Shelton, P.O. Box 9922, Chenoweth Run Rd., Jeffersontown, Ky. 40299

[21] Appl. No.: 85,482

[22] Filed: Oct. 17, 1979

[51] Int. Cl.$^3$ ............................ B01F 5/04; B67D 5/54
[52] U.S. Cl. .................................... 366/165; 222/630; 366/167
[58] Field of Search ..................... 222/142.1, 547, 564, 222/193, 189; 366/167, 174, 341, 349, 165

[56] References Cited

U.S. PATENT DOCUMENTS

| | | | |
|---|---|---|---|
| 3,510,108 | 5/1970 | Yego, Jr. | 366/167 X |
| 4,008,580 | 2/1977 | Heber | 366/167 X |

Primary Examiner—Allen N. Knowles
Attorney, Agent, or Firm—Edward M. Steutermann

[57] ABSTRACT

The present invention discloses a new and useful filter aid dispensing arrangement for use in dispensing a powdered filter aid to uniformly precoat a filter media in a liquid filtration device where the arrangement includes: a container having a sidewall defining an open end to receive powdered filter aid and a closed end; apertures advantageously located in said sidewall to allow excess powdered filter aid to flow out of the container when a predetermined quantity of powdered filter aid is accumulated in the container where the container is in a first position; a handle to position the container in a first and a second position; a slot provided in transversely aligned relation in the sidewall adjacent the open end of the container to receive a bracket disposed in vertically aligned relation to secure the container in the second position; a baffle located within said container adjacent the open end and disposed across the container; a fluid inlet tube provided in the sidewall to admit a liquid tangentially when the device is in the second position; a liquid deflector located within the container at the outlet of the fluid inlet tube to direct fluid carried by the fluid inlet tube tangentially and toward the closed end of the container to thoroughly mix liquid with filter aid contained within the container to form a precoat slurry where the precoat slurry is dispensed from the container through the aperture, slot, and open end of the container.

5 Claims, 4 Drawing Figures

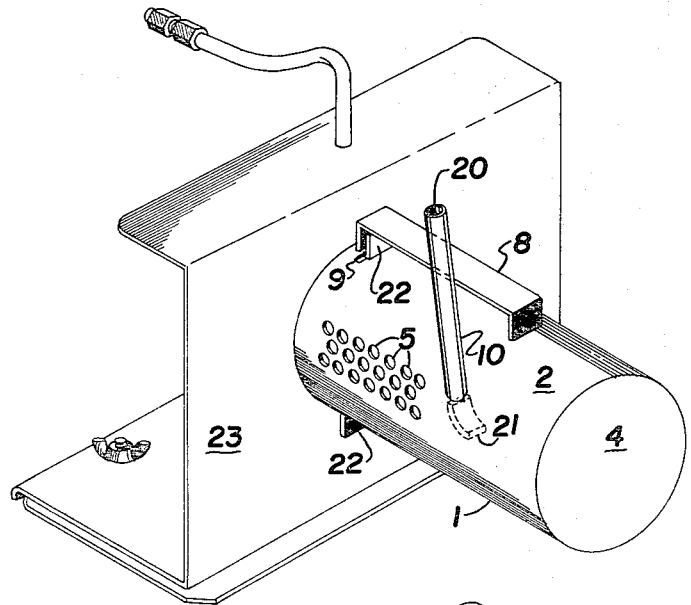
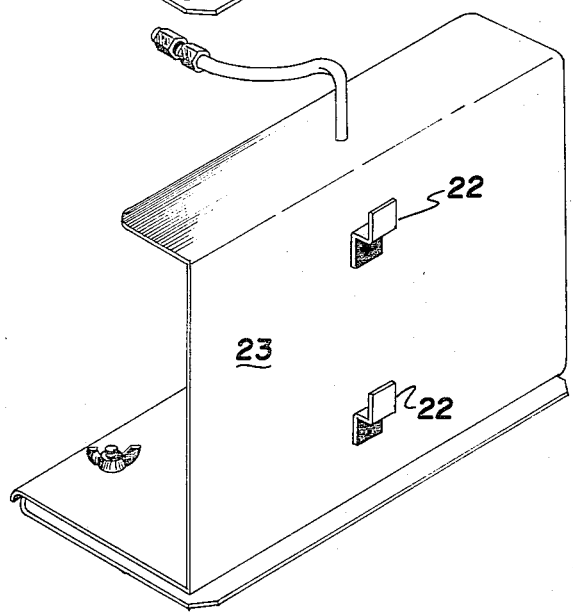

FILTER AID DISPENSING ARRANGEMENT

BACKGROUND OF THE INVENTION

The present invention relates to devices for precoating a filter media to allow for filtration of a liquid substance, more particularly, a filter aid dispensing arrangement where a filter aid, for example, diatomaceous earth, is placed in container means and a liquid substance is supplied to the container means to mix with the filter aid to form a precoat slurry and where the slurry is emitted through openings provided in the container means to deposit the precoat slurry on a filter medium.

Heretofore, the general procedure used in precoating the filter media required mixing filter aid and precoat liquid, for example by stirring in a separate container where the liquid may or may not be the substance to be filtered to form a precoat slurry which was then deposited on the filter media. In such methods it was very difficult to get a uniform precoat slurry so the filter aid was usually not deposited uniformly on the filter media. Accordingly in many instances it was necessary to provide other means to uniformly deposit the precoat on the filter media before filtration. In cases where the filter media is a thin substance, such as paper, and mechanical spreading is utilized the spreading action can tear the filter media.

Moreover, such methods are time consuming and require a laborer to stir the filter aid with a liquid substance to form the precoat slurry and still do not provide a uniform layer of filter aid deposited on the filter media. In some instances, the liquid substance mixed with the filter aid is very hot, such as cooking oil which is to be filtered before being reused. Also in previous arrangements no means are provided to accurately measure the amount of filter aid without transferring the filter media to the mixing device.

SUMMARY OF THE INVENTION

The unique design of the present invention provides for accurately measuring the filter aid mixing with a fluid substance and for uniformly depositing the filter aid on the filter media to eliminate human error.

More particularly the present arrangement provides a container means having sidewall means defining an open end and closed end where the container means can be provided with handle means to position the container in a first position, for example a vertical position with the open end up. Powdered filter aid is then poured into the container means where aperture means are advantageously provided in the sidewall to allow only a selected quanity of filter aid to remain in the container means. The apertures are located in the sidewalls at a preselected location to retain a predetermined quantity of filter aid in the container. The excess powdered filter aid flows through the aperture means and out of the container means. Arrangement within the scope of the present invention can include baffle means located within said container means where baffle means can provide serrated edges defining small openings between the baffle means and inner surface of the container means where the baffle means holds the powdered filter aid in the container means when the container means is moved to a second position, for example, a horizontal position where the liquid is introduced to the container, also slot means can be provided in transversly aligned relation in said sidewall adjacent to the open end of the container means to receive cooperative brackets disposed in vertically aligned relation to secure container means in second position.

The arrangement further includes a fluid inlet tube means in the sidewall to receive liquid substance to be mixed with the filter aid in the container where liquid deflector means are provided in the container means to prevent the tube from entering the container means and to deflect, tangentially, the liquid substance carried by the tube as the liquid substance enters the container means. The tangential deflection of the liquid provides that the entire quanity of powdered filter aid is mixed with the liquid substance and carried from the container means in a homogenous slurry. The liquid substance mixed with the filter aid forms a precoat slurry which is emitted from the container through the openings provided by the serrated edges of the baffle means to the slot means, the open end of the container means, and the aperture means. The liquid passing through the filter media can be recycled by a pump to the container means until the liquid substance is completely mixed and emitted from the container as a slurry.

The present device can be advantageously utilized in food processing, where dirty cooking oils need to be filtered in order that the oil may be reused saving considerable expense due to the high cost of cooking oil. The dirty cooking oil can then be directly pumped from the cooking device into a filtration system where the oil would enter the container means mixing with the filter aid and uniformly deposit the precoat slurry containing the filter aid and the cooking oil on the filter media. Once the dirty cooking oil is properly filtered it can be pumped back into the cooking device and be reused.

It is recognized, that the filtration devices within the scope of the present invention can be utilized in either pressure or vacuum induced filtration.

It is further recognized that various other arrangements within the scope of the present invention will occur to those skilled in the art upon reading the disclosure set forth hereinafter.

BRIEF DESCRIPTION OF THE DRAWINGS

The present invention is illustrated in the accompanying drawing wherein:

FIG. 3 is a rear perspective view of the filter aid dispensing device and filter media clamping device provided in accordance with the present invention with the filter aid dispensing device in a second position.

FIG. 4 is a perspective view of the filter media clamping device.

Figure 1:
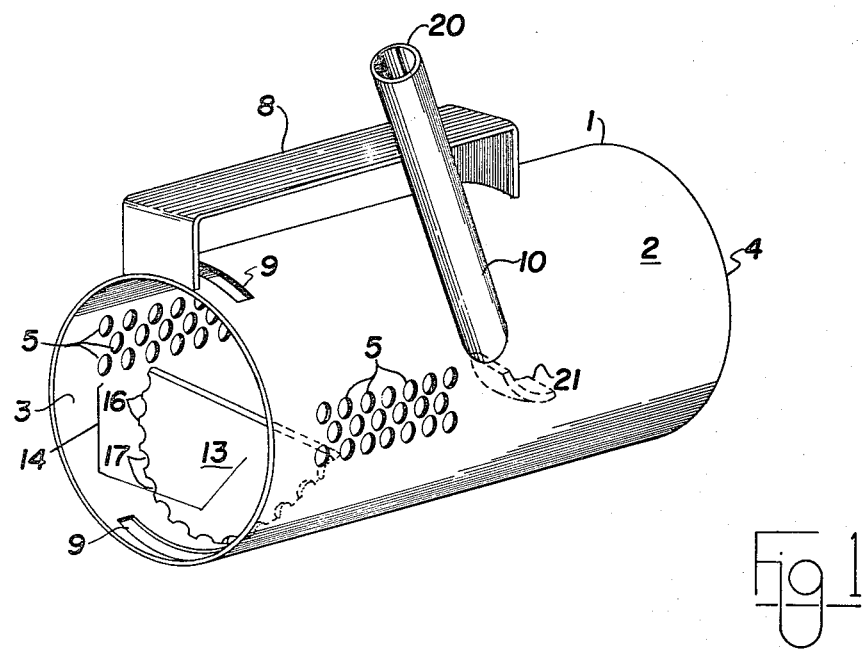
FIG. 1 is a perspective view of one example of a filter aid dispensing device in accordance with the present invention.

Referring now to the drawings and particularly to FIG. 1, thereof, there is illustrated a device 1 in accordance with the present invention for dispensing filter aid uniformly on a filter media.

Figure 2:
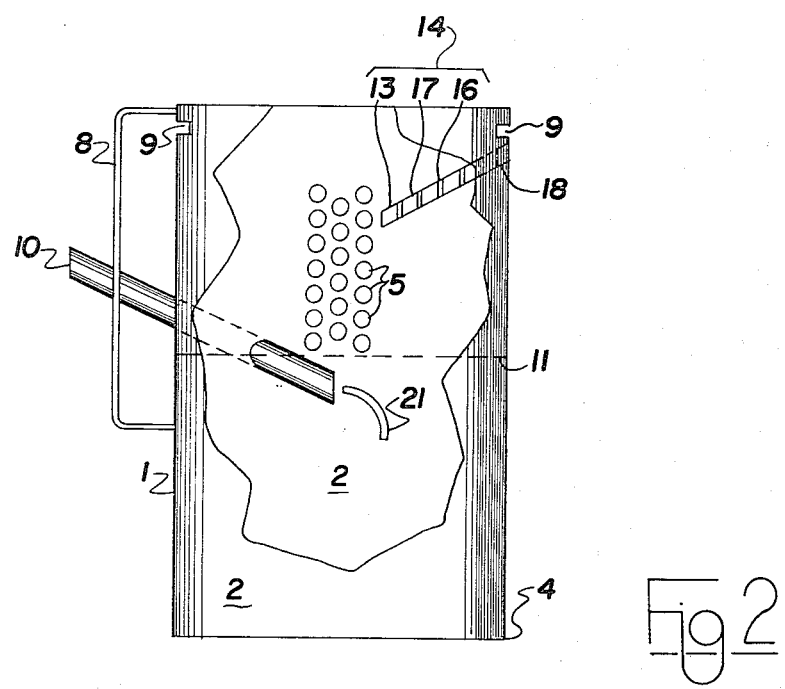
FIG. 2 is a partially broken, elevational view of the device shown in FIG. 1 with the device in a first position.

The filter aid dispensing device shown in FIGS. 1 and 2 in accordance with the present invention includes a container means 2 having a generally cylindrical sidewall defining an open end 3 to receive a free flowing powdered filter aid (not shown) and a closed end 4. The device is designed to hold a predetermined quantity of powdered filter aid as described hereinafter when the container means 2 is in a first or upright position as shown in FIG. 2. In this regard container means 2 further includes aperture means 5 advantageously located at a selected position along the length of the sidewalls to retain a selected quantity of filter aid below apertures 5 and allow powdered filter aid in excess of the desired amount as shown by dotted line 11 in FIG. 2 to flow out of the container when the container means 2 is in its first position shown in FIG. 2.

As further illustrated in FIGS. 1 and 2 the filter aid dispensing device 1 includes handle means 8 attached to the outside of the container means 2 to position the container means 2 in a first upright position as shown in FIG. 2, or second horizontal position as shown in FIG. 1.

Baffle means 14 can be located within container means 2 adjacent the open end 3 and, as shown, are disposed transversly across the container means to abut sidewall of the container. In the example shown, baffle means 14 is a semicircular plate 13 having serrated semicircular edges 16 to define openings 17 between baffle means 14 and the sidewall of container 2. Baffle means 14 is positioned at an angle 18 (shown in FIG. 2) in the container means 2 where the semicircular plate 13 is inclined toward the closed end 4 of the container means 2 in order to hold the powdered filter aid in the container means 2 when the container means is moved to the horizontal position shown in FIG. 2.

As shown in FIGS. 1 and 2 device 1 is provided with a fluid inlet tube means 10 that enters the container means 2 tangentially having an inlet port 20 where a tube (not shown) can be inserted in fluid inlet tube means 10 to provide for the liquid to enter the container means to mix with the powdered filter aid to provide a precoat slurry. A deflector means 21 can be provided to prevent the tube from entering the container means 2 and direct the liquid substance to the closed end 4 of the container to throughly mix the filter aid providing for all the filter aid to flow out of the container.

As shown in FIGS. 1, 2 and 3 slot means 9 can be provided in transversly aligned relation in sidewall 2 adjacent the open end 3 to receive brackets 22 disposed in vertically aligned relation where the brackets can be attached for example to a filter media clamp means 23 as shown in my copending application Ser. No. 069,896 filed Aug. 27, 1979, to hold the container in a horizontal or second position.

Slot means 9, as shown, are located so that the baffle means is at the bottom of the container 2 when the container is in the position shown in FIG. 1 and handle 8 is uppermost.

In operation, the filter aid dispensing device is placed in the upright or first position as shown in FIG. 2. Powdered filter aid is then poured into the container means 2 through the open end 3. As the powdered filter aid fills the container means 2 and reaches a level shown by dotted line 11 the excess is emitted through apertures 5 to provide a predetermined quanity of powdered filter aid.

The operator then grasps the filter aid dispensing device 1 by the handle means 8 and positions the device 1 in the position shown in FIG. 3, for example by use of brackets 22, on the filter media clamping means 23.

A liquid supply tube, not shown, is inserted in the fluid inlet tube means 10 where liquid fluid inlet tube means 10 are provided to allow the liquid to enter the container 2 tangentially and mix with the filter aid in the container means to provide a precoat slurry. The deflector means 21 prevents the tube carrying the liquid from entering the container means 2 and further directs the liquid into container means 2 tagentially and directs a portion of the liquid toward the closed end 4 of the container means to throughly mix the liquid with the filter aid. The liquid and the filter aid forms a slurry (not shown) which flows out through openings 17 provided by serrated edges 16 of the baffle means 14 to slot means 9 and the open end 3 of the container means 2. Additionally, slurry flows from the container means 2 through aperture means 5, slot means 9 and open end 3 of the container means to provide a homogenous precoat slurry to uniformly precoat a filter media (not shown).

It will be recognized that the unmixed filter media is retained in container 2 by baffle 14 until the slurry has formed and is forced through openings 17 and 5.

It is to be understood that various other arrangements within the scope of the present invention will occur to those skilled in the art upon reading the disclosure set forth hereinafter.

The invention claimed is:

1. A filter aid dispensing device including: container means having sidewall means defining an open end to receive powdered filter aid and a closed end; aperture means located at selected locations in said sidewall means in spaced relation from said closed end to allow excess powdered filter aid to flow out of said container means when a predetermined quantity of powdered filter aid is accumulated in said container means when said container means is in first position; handle means to position said container means in first and second positions; slot means in transversly aligned relation in said sidewall means adjacent said open end of said container means to receive brackets disposed in vertically aligned relation to secure said container means in said second position; baffle means located within said container means adjacent said open end and disposed across said container means adjacent said sidewall means; liquid inlet tube means provided in said sidewall means to admit and direct a liquid tangentially to said container when said container means is in said second position to throughly mix said filter aid contained within said container means and liquid admitted through said liquid inlet tube means to form a precoat slurry where said slurry is dispensed from said container means through at least one of said aperture means, slot means and said open end of said container means.

2. The invention of claim 1 including liquid deflector means located within said container means at the outlet of said liquid inlet tube means to direct liquid carried by fluid inlet tube means tangentially toward said closed end of said container means.

3. The invention of claim 1 where said container is cylindrical of selected diameter and baffle means located within said container means adjacent said open end of said container means and disposed across the container means adjacent said open end of said container means and disposed across the container means adjacent said sidewall means and includes semi circular plate means having serrated semi circular edges adjacent the sidewall of said container providing openings between said baffle means and the inner surface of said container means.

4. The invention of claim 1 where said filter aid dispensing device dispenses said precoat slurry onto a filter media.

5. The invention of claim 1 where said filter aid dispensing device is attached to bracket means to secure said container means in a second position horizontal position.

* * * * *